United States Patent
McMahon et al.

(10) Patent No.: US 10,453,019 B1
(45) Date of Patent: Oct. 22, 2019

(54) BUSINESS ACTIVITY RESOURCE MODELING SYSTEM AND METHOD

(75) Inventors: Gordon McMahon, Chapelhall (GB); Steven Grill, Fair Lawn, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 1125 days.

(21) Appl. No.: 13/593,076

(22) Filed: Aug. 23, 2012

(51) Int. Cl.
*G06Q 10/06* (2012.01)

(52) U.S. Cl.
CPC .................. *G06Q 10/067* (2013.01)

(58) Field of Classification Search
CPC .................................... G06Q 10/067
See application file for complete search history.

(56) References Cited

U.S. PATENT DOCUMENTS

| | | | |
|---|---|---|---|
| 7,076,765 B1* | 7/2006 | Omori | G06F 9/455 717/121 |
| 8,490,049 B2 | 7/2013 | Bouillet et al. | |
| 2001/0044738 A1* | 11/2001 | Elkin | G06F 8/34 705/7.15 |
| 2004/0034543 A1 | 2/2004 | Bartsch | |
| 2004/0111302 A1* | 6/2004 | Falk | G06Q 10/10 705/4 |
| 2005/0091093 A1* | 4/2005 | Bhaskaran | G06Q 10/06 705/7.36 |
| 2005/0256752 A1* | 11/2005 | Ramachandran | G06Q 10/06 705/7.37 |
| 2007/0094673 A1* | 4/2007 | Hunt | G06F 9/4411 719/321 |
| 2012/0260233 A1 | 10/2012 | Bandyopadhyay et al. | |
| 2012/0265727 A1* | 10/2012 | Naryzhnyy | G06F 17/30569 707/602 |

FOREIGN PATENT DOCUMENTS

| | | |
|---|---|---|
| CA | 2362812 | 6/2001 |
| EP | 1701260 | 9/2006 |
| EP | 1703386 | 9/2006 |
| EP | 2466461 | 6/2012 |
| WO | WO-2001043030 | 6/2001 |
| WO | WO-2002069142 | 9/2002 |
| WO | WO-2004010354 | 1/2004 |
| WO | WO-2005010749 | 2/2005 |
| WO | WO-2007130200 | 11/2007 |
| WO | WO-2009094290 | 7/2009 |
| WO | WO-2009134927 | 11/2009 |

* cited by examiner

*Primary Examiner* — Alan S Miller
*Assistant Examiner* — Arif Ullah
(74) *Attorney, Agent, or Firm* — Greenblum & Bernstein, P.L.C.

(57) ABSTRACT

A Business Activity Resource modeling system and method is disclosed that simplifies the conceptual modeling approach, allows for the reuse of model components and for efficient testing, and meets various other industry needs. By utilizing a plurality of Business Activity Resource units (BARs) that are associated with a number of business rules, events, objects and terms, any number of business activities may be completed to meet important business requirements. The disclosed modeling engine models the business activities using at least one processor and is configured to perform a number of actions, including receiving modeling input from a user, generating the business model based on the modeling input of the business activity model, storing the business activity model in a model data repository and generating executable code corresponding to the business activity model to perform any number of business processes.

30 Claims, 11 Drawing Sheets

BUSINESS ACTIVITY RESOURCE MODELING SYSTEM AND METHOD

FIELD OF THE INVENTION

Embodiments of the present invention are related to systems and methods of modeling business requirements and processes in the development of software and technology, and in particular, relate to a business activity resource modeling system and method.

BACKGROUND OF THE INVENTION

In technology and software development, it is currently difficult to define technical specifications in a clean, concise, and easy to implement manner. Specifications and the models used to define business processes are often ambiguous and fail to consider all requirements of a particular system, such as business or non-functional requirements. Further, they often fail to define with specificity the function, data used, and output of each of the important system components, but instead, describe the business requirements on a general level. Yet, these specifications and models are regularly provided to developers as primary sources of guidance in implementation, often leading to confusion of business term meanings, the creation of redundant and similar artifacts, and the improper execution of business operations. The resulting products often do not meet the business requirements, are tremendously costly, and/or are significantly delayed.

Moreover, while Model Driven Development (MDD) has been utilized in an attempt to solve some of these problems by focusing on standardized models of a system's business functionality and behavior, models that have been developed under the MDD framework are complicated and inefficient in implementation. These models, for example, do not allow business users and analysts to easily reuse previously created work products, including components that were used in other projects. Instead, because such models often require and result in the integration of components with one another in implementation, reuse in other projects is simply not possible. As another consequence of such integration, testing is often costly as it must be performed on the development program as a whole. Thus, while these models based on MDD and similar frameworks seek to increase inefficiency in the development of software and technology across multiple platforms, they, too, have shortcomings that result in inefficiency and increased cost during development.

As a result, currently available solutions are inefficient and ineffective, and, therefore a modeling technique that allows for business requirements to be directly mapped to technical implementations is needed.

SUMMARY OF THE INVENTION

In one aspect of the present invention, a business modeling system is disclosed for modeling business processes with a business activity model for use in software development that includes a model data repository and a modeling engine. The modeling engine models the business activity using at least one processor and is configured to perform a number of actions, including: receiving modeling input from a user, generating the business model based on the modeling input of the business activity model; storing the business activity model in a model data repository; and generating executable code corresponding to the business activity model that performs at least one business process of the business processes. In one embodiment, the business model is made up of at least one business package which is made up of a plurality of business activity units that, together, are configured to perform a particular business process.

The business model is made up of at least one business activity unit, each of which is associated with a business event and a business rule. In an embodiment, the detection of the event causes a computer system to execute at least a portion of the executable code corresponding to a business rule. The business rule, thus, may control how a business activity is processed by a computer system executing at least a portion of the executable code corresponding to the business activity. Further, the business rule may be a validation rule, a mapping rule or an enrichment rule. The modeling system may also group a plurality of such business rules according to the types of rules.

In addition, the business event may be a trigger event, an exit event, a sequence event, or an internal event. A trigger event, for example, may trigger the processing of the business activity unit and an exit event may trigger the processing of a second business activity unit. In a preferred embodiment, each business activity unit may be associated with only one trigger event. In addition, a sequence event may cause the communication with at least one external service or computer system.

The business activity unit, in one embodiment, may be further associated with a business object that includes a plurality of business terms. The business rules, similarly, may include a plurality of business terms. Accordingly, the business modeling system may store various business terms in the model data repository of the modeling system for use by the modeling engine and other components and engines of the system.

In one embodiment, the user's modeling input may include the selection of the at least one business activity unit or the business event and the modeling engine may be configured to further model a second business activity model that includes the at least one business activity unit or a second at least one business activity unit that is associated with the business event. Indeed, the business activity unit and the business event may be independently configured from the business activity model, in one embodiment.

In another aspect of the present invention, a method for modeling business processes with a business activity model for use in software development is disclosed. The method includes the steps of: receiving modeling input from a user; generating, using at least one processor, the business activity model based on the modeling input; storing the business activity model in the model data repository; and generating executable code corresponding to the business activity model that performs at least one business process. The business activity model may include at least one business activity unit that is associated with a business event or a business rule.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

A Business Activity Resource ("BAR") modeling system and method is disclosed that simplifies the conceptual modeling approach and meets the industry's current needs. To fully understand the functions of the BAR modeling system and method, the Business Activity Resource model is first described.

A BAR model may be made up of a number of Business Resource Activity units (each unit, hereinafter referred to as a "BAR"), each of which may be perform one or more units of work or a business activities when processed by a BAR modeling system. A BAR, for example, may cause a very specific action to be taken, such as the validation of a variable for content and structure. Of course, each BAR may be configured to complete any number of actions, be it complex or otherwise simple actions.

Figure 1:
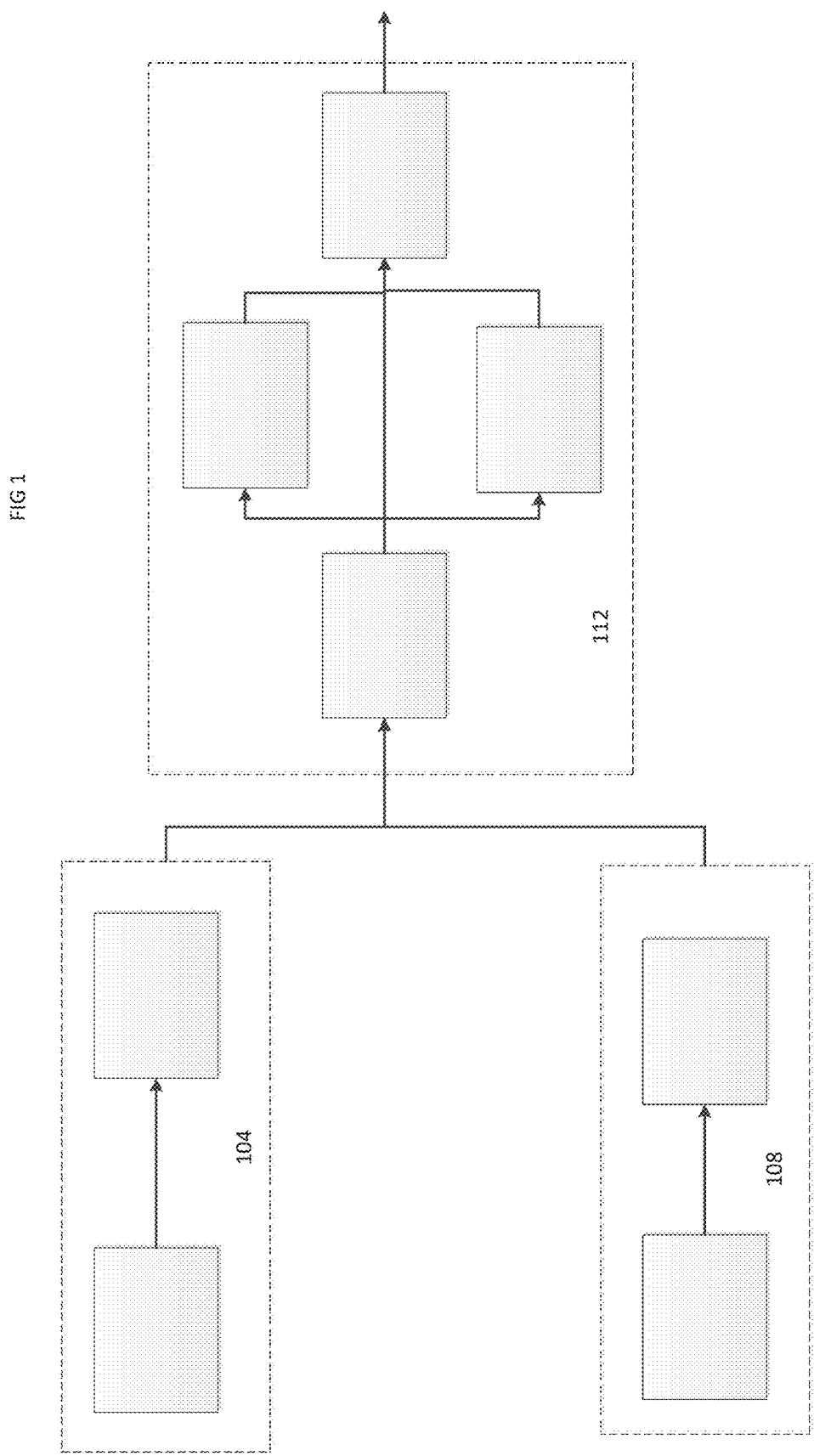
FIG. 1 illustrates a Business Activity Resource model in accordance with an embodiment of the present invention.

Further, a collection of BARs may be grouped into one or more BAR packages to deliver particular capabilities. FIG. 1, for instance, depicts a BAR model in accordance with an embodiment of the invention comprising a plurality of BAR packages 104, 108 and 112, each of which contains a plurality of BARs. As an example, a BAR package can be configured to retrieve, validate and store user-entered information into a specific database. Thus, a BAR model may be configured to make up a plurality of BAR packages that together include hundreds or even thousands of individual BARs. Using these components, a software or technology may be entirely created through the development of a BAR model. Once a BAR model for a particular product has been defined, embodiments of the present invention may dynamically generate corresponding code from the definition for use across any number of platforms and channels.

Embodiments of the present invention allow for the defining of BARs separately from any instances of a BAR model or a BAR package. As a result, BARs may be defined, implemented and reused in any number of software projects (e.g., across BAR models) without modifications. Thus, BARs may be designed and reused over and over again.

Similarly, BAR packages may be designed to provide one or more capabilities and reused across projects. Further still, the components making up a BAR may also be configured and re-used. Accordingly, the present invention provides a scalable, enterprise-wide solution that is much needed in the industry.

Figure 2:
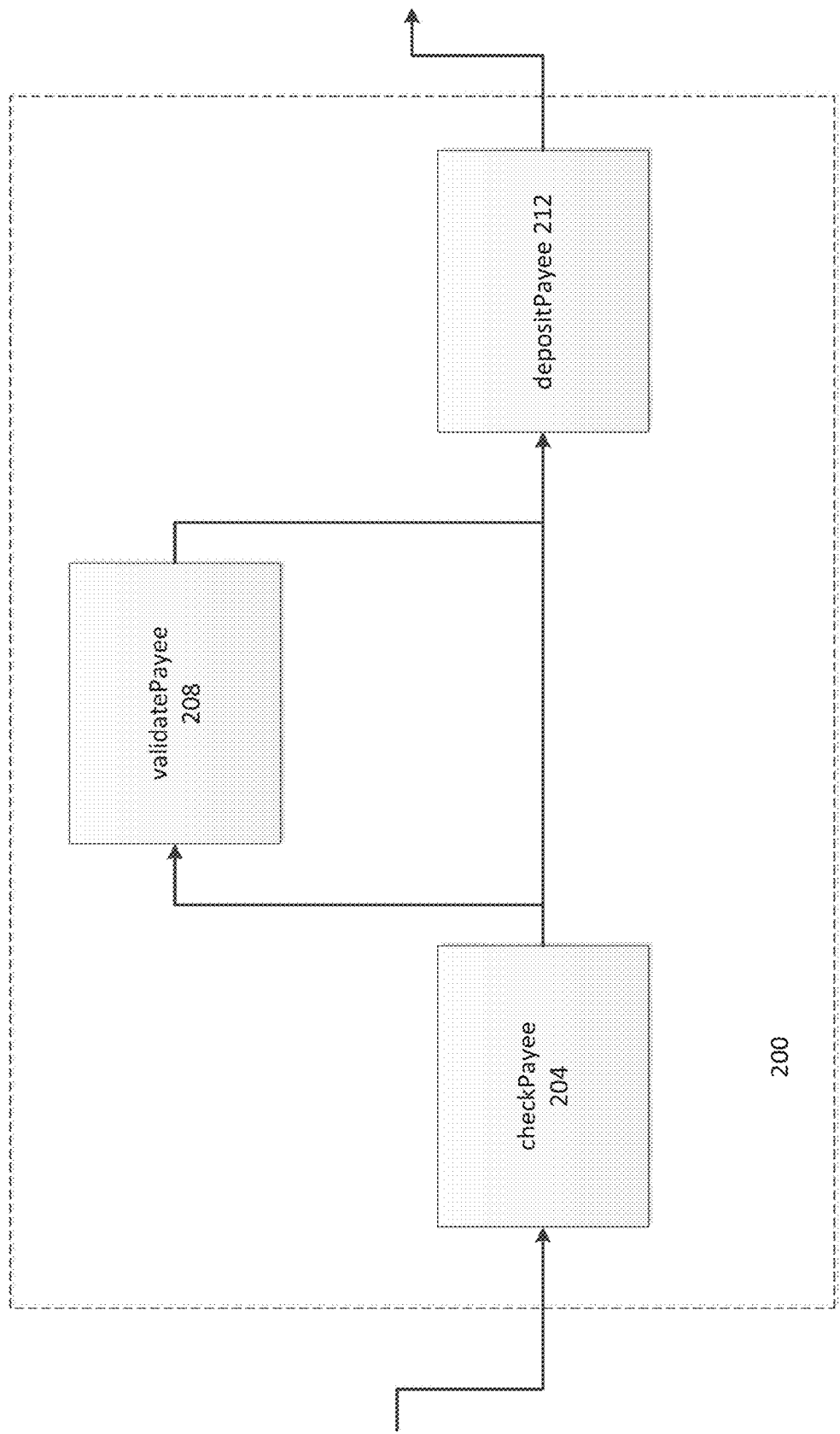
FIG. 2 depicts an exemplary BAR package configured to facilitate the depositing of a check amount into an account, in accordance with an embodiment of the present invention.

In the preferred embodiment, each BAR may be utilized to represent distinct business requirements. FIG. 2, for example, illustrates a BAR package that causes the depositing of a check amount into a payee's account and includes three BARs—a checkPayee BAR 204, a validatePayee BAR 208, and a depositPayee BAR 212. Each BAR satisfies a particular business requirement: 1) that the payee's account is verified; 2) that the payee's account is validated; and 3) that the check is deposited, accordingly. Specifically, the checkPayee BAR 204 checks for the existence of a payee account name based on a received check and triggers an event that causes the validatePayee BAR 208 to initiate and validate the payee account name. In addition, the validatePayee BAR 208 may initiate an event that triggers the depositPayee BAR 212 to process the check and credit the payee's savings account with the check value. Thus, BARs may perform rudimentary or simple tasks and a group of BARs may be assembled together to complete one or more actions in a manner that meets one or more business requirements of a product.

Figure 3:
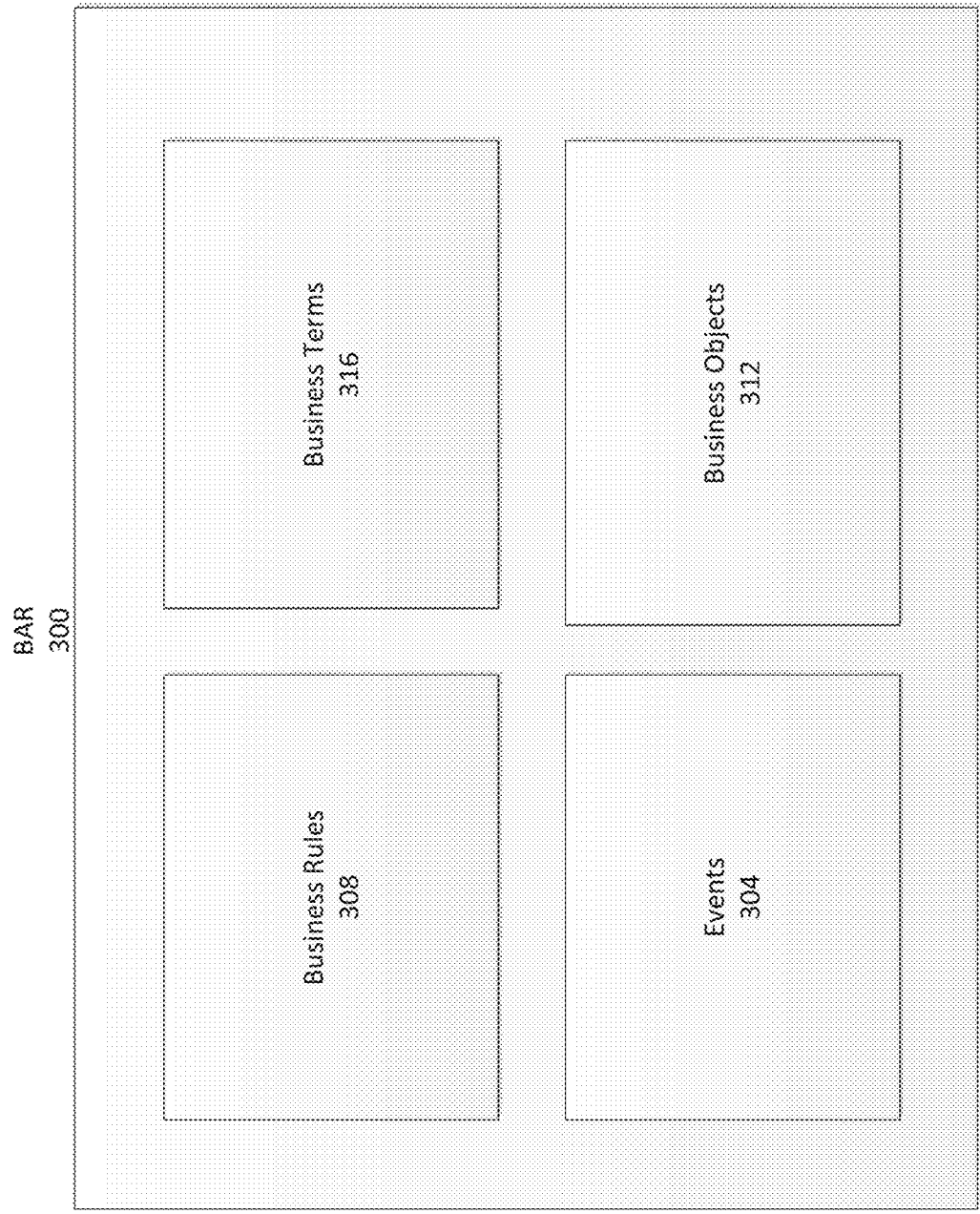
FIG. 3 illustrates a BAR including its components in accordance with one embodiment of the present invention.

FIG. 3 illustrates a BAR including its components in accordance with one embodiment of the present invention. As seen, a single BAR 300 may comprise events 304, business rules 308, business objects 312 and business terms 316, which together, provide a complete description of all the processes resulting from the processing of the BAR. More specifically, each BAR may operate in response to various events 304 and may operate to evaluate such events according to business rules 308, which may be defined using business terms 316. Furthermore, the business rules 308, when executed, may cause a system to analyze, create and/or modify business objects 312 in a number of manners.

Figure 4:
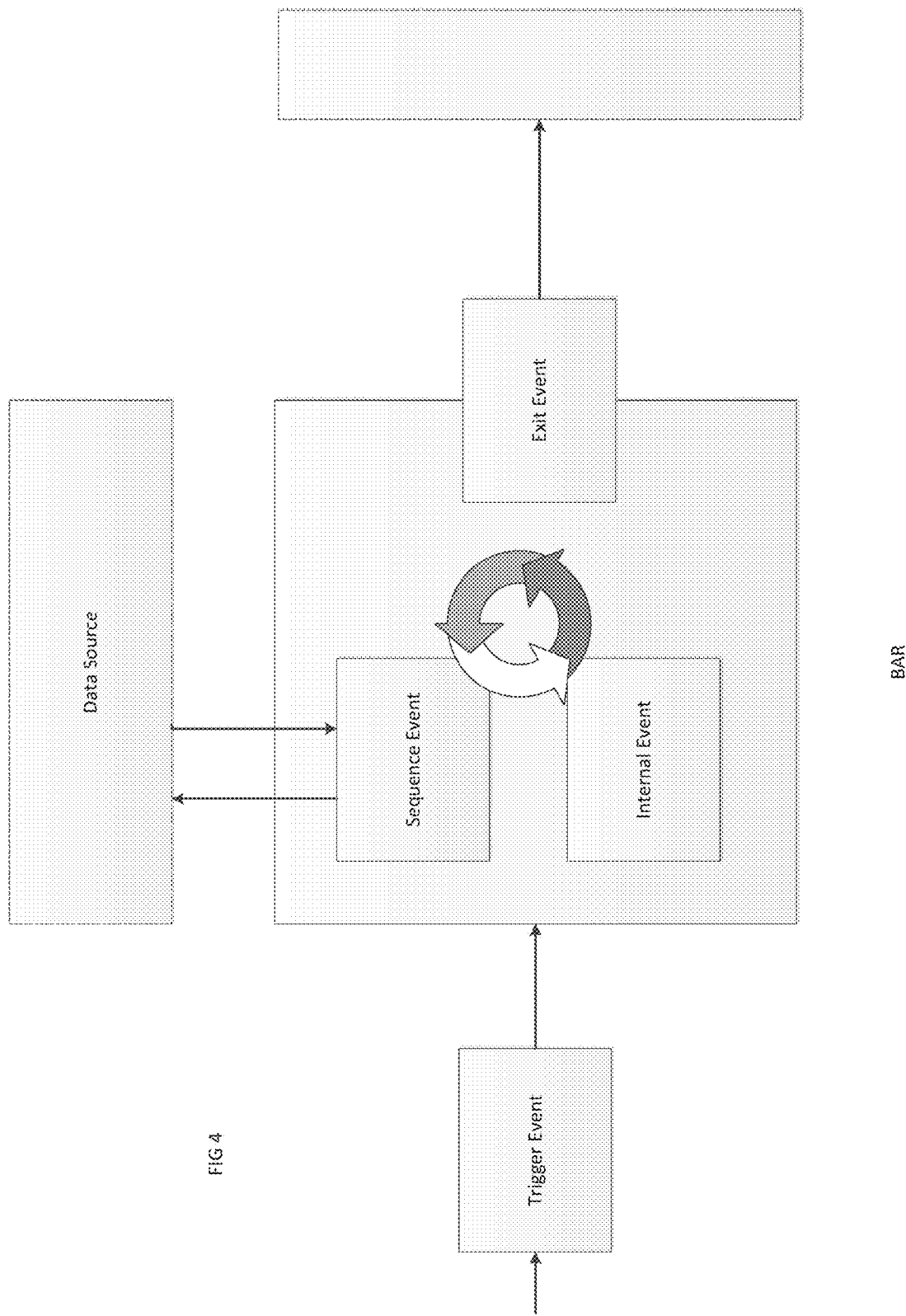
FIG. 4 illustrates the relationship of various business events with respect to a BAR in accordance with an embodiment of the present invention.

BARs may be made up of a number of different types of events, including trigger events, internal events, sequence events, and exit events. FIG. 4, for example, illustrates the relationship of these types of events with respect to a BAR in accordance with an embodiment of the present invention.

Trigger events 404 are events that initialize the processing of BARs. For example, a trigger event, checkReceived, may when triggered, may cause a BAR package to be processed to receive and validate checking data. Further, a trigger event may also be associated with data that is received by any BAR that responds to the trigger event. In the preferred embodiments, each BAR may only be initiated by one triggering event.

Further, there may be multiple types of triggering events: application events, application service events, business events, user service events and channel events. An application event is an event which has been initiated by an application in which data translation may be required, as the data associated with the event and/or application may be un-normalized. Such translations are typically performed to support application service events, which correspond to service operations performed by the business within a defined business process hierarchy. One example of a trigger application event is an event by an external transaction system (i.e., another bank) that causes the receiving of transaction data within an existing system. For instance, a payment from another bank may be in a proprietary form. In order to process this payment request, it is necessary to translate the information into the form expected by the "Receive Payment Instruction" service operation, or application service event, which corresponds to the business function described in a business process models associated with the Payments service. The Payment instruction from another bank represents an external application (and application event), which is translated (through a BAR package) into an application service event, which may then be translated into an application event for an existing internal application which can process the received payment instruction.

A business event, in contrast, may be an event initiated by a business service wherein data associated with the event may not require translation as the data may already be normalized. Thus, a trigger business event may be initiated by another business service, such as another BAR. Using the BAR of FIG. 2 as an example, the validatePayee BAR 208 may include a trigger event payee_need_validation that may be initiated by the checkPayee BAR 204. In other words, after the checkPayee BAR 204 has determined that the payee account name on the pay to entry of a check is valid, the checkPayee BAR 204 may trigger a payee_need_validation event, causing the validatePayee BAR 208 to be processed. In another example, disclosure requests can be received from various parties, both internal and external. The validation of that disclosure request, irrespective of the source, is processed in the same way through a commonly defined business event (in this case, through the "Validate Disclosure Request Created" business event.

A user service event is an event that may be initiated in response to a user interaction through a channel event, such as a user interaction with a touch-screen interface that initiates the creation of a user account, for example. Thus, the user's submission of a check may cause the initiation of the checkPayee BAR 204 of FIG. 2.

In addition to trigger events, a BAR may also be associated with internal events 412, which cause the execution of rules against business objects. In addition, internal events may be automatically initiated upon the triggering of a BAR or in response to other internal or sequence events. Further, various business rules may be processed upon the initiation of internal events. For example, upon the initiation of a rule, an internal event may cause the performance of extensive validation checks on the business objects that may be referenced in an exit event (or other events) of the BAR. In doing so, complex logic may be defined separately from exit events, thereby simplifying the actions that are taken with respect to each event and increasing the opportunity to reuse events across different BAR models. In the preferred embodiment, internal events do not require data or information from sources external to the BAR.

Sequence events 416 cause data requests to be transmitted and received from external sources. In many cases, a BAR does not contain or have access to all of the necessary data needed to perform a particular action of the BAR. For example, the validatePayee BAR 208 may need to retrieve the Payee data in an accounts database or system, if present. Thus, a BAR, through sequence events 416 may retrieve business objects that may be analyzed, examined, and/or modified by other components of the BAR. In one embodiment, sequence events form a callout to an external source of information, which could be another BAR or other forms of external data (e.g., data services). Return values from the response may be returned to the BAR, accordingly. Embodiments of the present invention further have the capability to receive any data related error messages from such external sources (e.g., "requested data not found") and may be included as part of the business object/business term returned. In such embodiments, various actions may be taken by a BAR according to any returned error data.

BARs may further contain a number of exit events 420, each of which may transmit calls to call destinations outside of the BAR. In one preferred embodiment, exit events may cause asynchronous calls for action external to the BAR that do not result in the retrieval of any information from an external source to the BAR. In common cases, exit events may cause the initiation of a trigger event of another BAR. Exit events may also cause the initiation of various system processes at both internal and external systems.

By defining a trigger event for each BAR, any number of BARs may connect with one another through the initiation of corresponding trigger events, rather than through sequential actions. More importantly, BARs may be triggered by events, and not by the calling of the BAR by other BARs. As a result, each BAR is isolated from one another and from other components such that the BARs are not dependent on one another or on other components of a BAR model. This allows for reusability of the BARs across BAR models. Furthermore, a user of a BAR model system need not be concerned with dependencies of a BAR or its components on other BARs or components but, instead, may rely on each BAR as an individual unit to perform its specific function without any issues.

As briefly discussed above, events may be associated with one or more rules or sets of rules. Thus, rules may be associated with the triggering, internal, sequence, and exit events. When processed by a BAR system, such rules define the actions that may be taken as a result of the execution of the BAR and more specifically the event. When an event is processed—and therefore one or more associated rules are executed —rules allow a system architecture to design specific actions to be taken according to business logic, business objects and various other attributes or data. The rules of a BAR, thus, may make up the core logic of a BAR.

There may be a number of different types of rules that are executed, including validation rules, mapping rules and enrichment rules. Validation rules may validate particular business objects to ensure that the content of any data meets a specific requirement while mapping rules may map data between attributes of input and output data. In addition, enrichment rules may cause a BAR to enrich data by requesting additional data. Thus, an enrichment rule is often used in conjunction with a sequence event. Each distinct rule type may be grouped into a Rule Set consisting of one or more rules.

In addition, rules are applied to business objects in order to perform the defined actions. As such, a rule must include a reference to at least one business object. Where a rule is made up of a number of business objects, each rule may have a one-to-many relationship with the various business objects by which these rules operate. In one embodiment, outcome of a rule will either be that no additional actions are taken with respect to the event, or additional business objects may be created as a result.

In the preferred embodiments, rules and sets of rules are defined with Natural Rule Language (NRL). Like BARs and other components, rules themselves may be defined externally and independently from any particular BAR model, BAR package, or BAR. In one embodiment in which all necessary data for the execution of rules is readily available to all BARs (e.g., all data is a part of the BAR model), rules need not be associated with any sequence or exit events. In such cases, rules may not be associated with any events or, if any, only triggering events.

The operations of BAR models largely depend on business objects. Business objects, which may be simply data objects, are retrieved, read, manipulated and stored upon execution of the BARs, its events, and its rules. The actions of BARs (e.g., the data created, the evaluations that occur) may vary according to the business objects being processed. For example, when validatePayee BAR 208 of FIG. 2 is processed, a sequence event may be initiated to retrieve from a database of "Customer" business objects (e.g., an instance of a Customer business object associated with "John Doe"). Upon retrieval, the validatePayee Bar 208 may ensure that the retrieved customer business object is valid. The exit events that are initiated, including the rules that are executed according to each exit event, in response, may be at least partly dependent on the values of the business objects retrieved.

Figure 5:
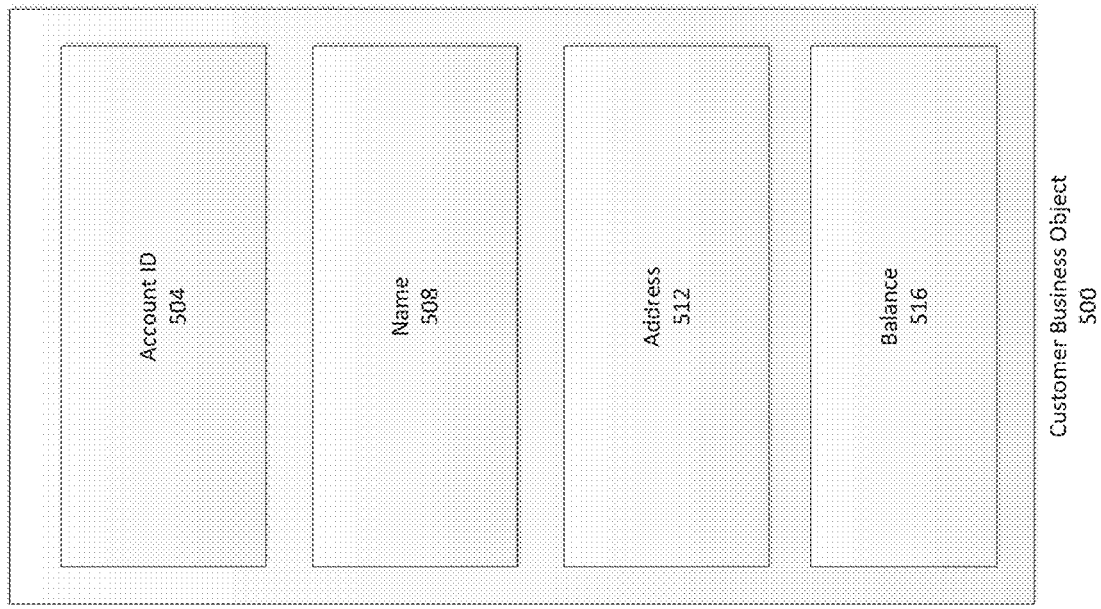
FIG. 5 depicts a Customer business object in accordance with an embodiment of the present invention.

In the preferred embodiment, each business object may be defined as a collection of qualified business terms which may be stored in a database glossary that, in one embodiment, is an XML scheme/table file. FIG. 5, for instance, depicts a Customer business object comprising a plurality of qualified business terms in accordance with an embodiment of the present invention. In this case, the Customer Business Object 500 is made up of 4 qualified business terms: Account ID 504, Name 508, Address 512, and Balance 516. In a preferred embodiment, each qualified business term may be made up of a unique namespace, a term, a definition of the term, and a version number. Thus, business objects and terms may not contain any physical naming conventions. Instead, each qualified business term may be mapped in the glossary to a physical implementation. In one embodiment in which each qualified business term is mapped to exactly one physical implementation, the term is disambiguated to precisely one physical implementation and, therefore, the qualified business term may operate as a simple alias for a specific physical artifact. In the preferred embodiments, business terms and business objects, like business rules, business events. BARs and BAR packages, may be defined separately from the BARs from which they are called or otherwise utilized to execute the business requirements.

By utilizing embodiments of the BAR model, members of a software development team may model the system in an efficient and accurate manner by systematically defining the business functions of the software being developed. By defining a system according to the model, the business requirements and business terms used within the business may be clearly defined, reducing miscommunications, misunderstandings and other errors when applying processing logic. The model further prevents the creation of redundant functions, definitions, data schemas, code and other artifacts. Moreover, the modularity of the components making up a BAR model allows for the efficient reuse of previously created work products.

Figure 6:
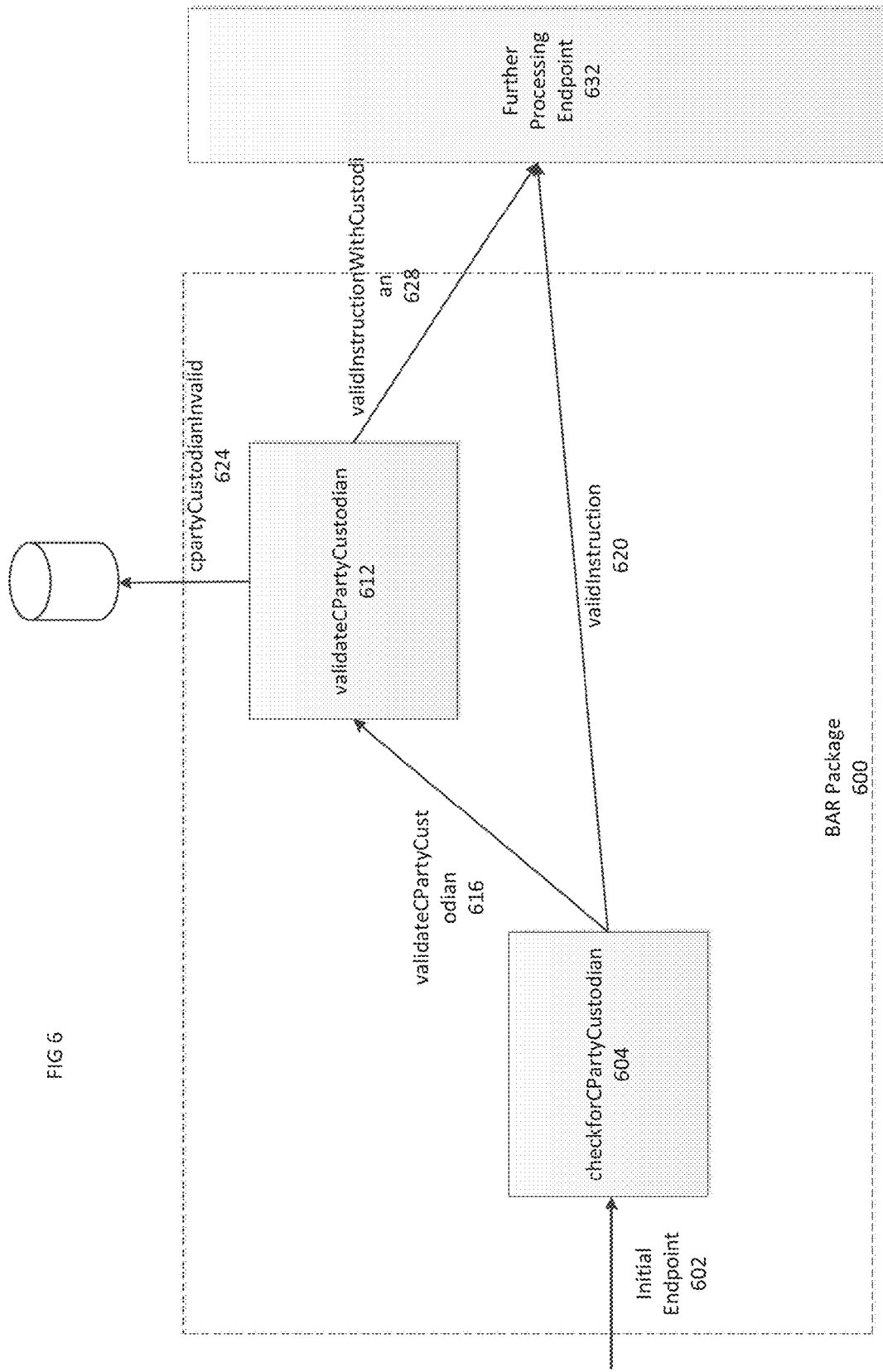
FIG. 6 depicts a simple BAR that is responsible for checking if a standard instruction has a valid counterparty Custodian in accordance with an embodiment of the present invention.

FIG. 6 depicts a simple BAR package that is configured to determine if a standard instruction has a valid counterparty custodian in accordance with an embodiment of the present invention. The BAR package contains two BARs: checkforCPartyCustodian BAR 604 and validateCPartyCustodian BAR 612. The BAR package is also illustrated to contain numerous events, including initial endpoint event 602, validateCPartyCustodian event 616, validInstruction event 620, cpartyCustodianInvalid event 624, and validInstructionwithCustodian event 628. In accordance with an embodiment of the present invention, the triggering of these events may cause the initiation of various BARs and other actions within the BAR package. Therefore, a computer system operating according to the BAR package 600 may traverse from one portion of the BAR package to another portion according to the initiation of these events in accordance with embodiments of the invention. For example, various events may be triggered and various BARs may be processed from initialization of the BAR package (via the initial endpoint event 602) to the completion of BAR package (ending at the logging of an error or the further processing end point 632), which may cause additional actions external to the BAR package 600. Thus, a computer processing the BAR package 600 completes a number of units of work or business activities as it processes the various BARs along a BAR path.

The BAR package 600 may begin to be processed upon the triggering of the initial endpoint event 602. Another system or process within a financial institution may initiate the initial endpoint event 602, causing the BAR package 600 to be processed. For example, a computer system configured to process financial transactions between parties, including securities transactions, may need to ensure that a standard instruction of a financial transaction has a valid counterparty custodian as part of its processing routine. This system may initiate execution of the programming instructions corresponding to the BAR package of FIG. 6 by triggering the initial endpoint event 602. In another embodiment of the BAR package 600, the package may be initiated by a user request to perform such functions. In one embodiment, the BAR package may also be initiated by processing an entry BAR, such as checkForCPartyCustodian BAR 604.

The checkforCPartyCustodian BAR 604 checks for the counterparty custodian in the standard instructions and requests custodian information from the determineCPartyCustodian external source 608 (if possible). If it is determined that there is a counterparty Custodian, it may cause the initiation of the validateCPartyCustodian event 616. If it is determined there is not a counterparty as part of the standard instructions, it may cause the initiation of a validInstruction event 620.

The validateCpartyCustodian event 616 is also the triggering event for the hasCPartyCustodian BAR 708. Therefore, when the validateCPartyCustodian event 616 is triggered by the checkforCPartyCustodian BAR 604, the hasCPartyCustodian BAR 708 is initiated and processed in response, causing the validation of the custodian information. If it is determined that the information is not valid, then an error may be logged at an external error log, as indicated in FIG. 6. If, however, it is determined that the counterparty information is valid, then the validInstructionwithCustodian event 628 may be initiated.

Upon either the initiation of the validInstructionwithCustodian event 628 or the validInstruction event 620, an external system, BAR package 600, such as other BAR models, BAR packages, BARs, or systems may be triggered for additional processing or action. Thus, utilizing various events, a plurality of BAR packages may be also linked together as well. For example, a BAR package may be triggered that is configured to process standard instructions that have valid counterparty custodian information while another BAR package may be triggered that is be configured to process valid instructions that do not have any or invalid counterparty custodian information.

The BAR package 600 may receive a business object, standardInstruction, when the BAR is initiated, which may contain the standard instruction that is to be checked for a valid counterparty custodian. The BAR package 600 including its BARs, may have access to the standardInstruction business object for processing. In some embodiments, the BAR package 600 may have access to all business objects and/or data of the computer system processing the BAR package. In such embodiments, no information need to be retrieved by or passed on to the BARs of the BAR package 600. In another embodiment, business objects need to be passed on from BAR to BAR.

Figure 7:
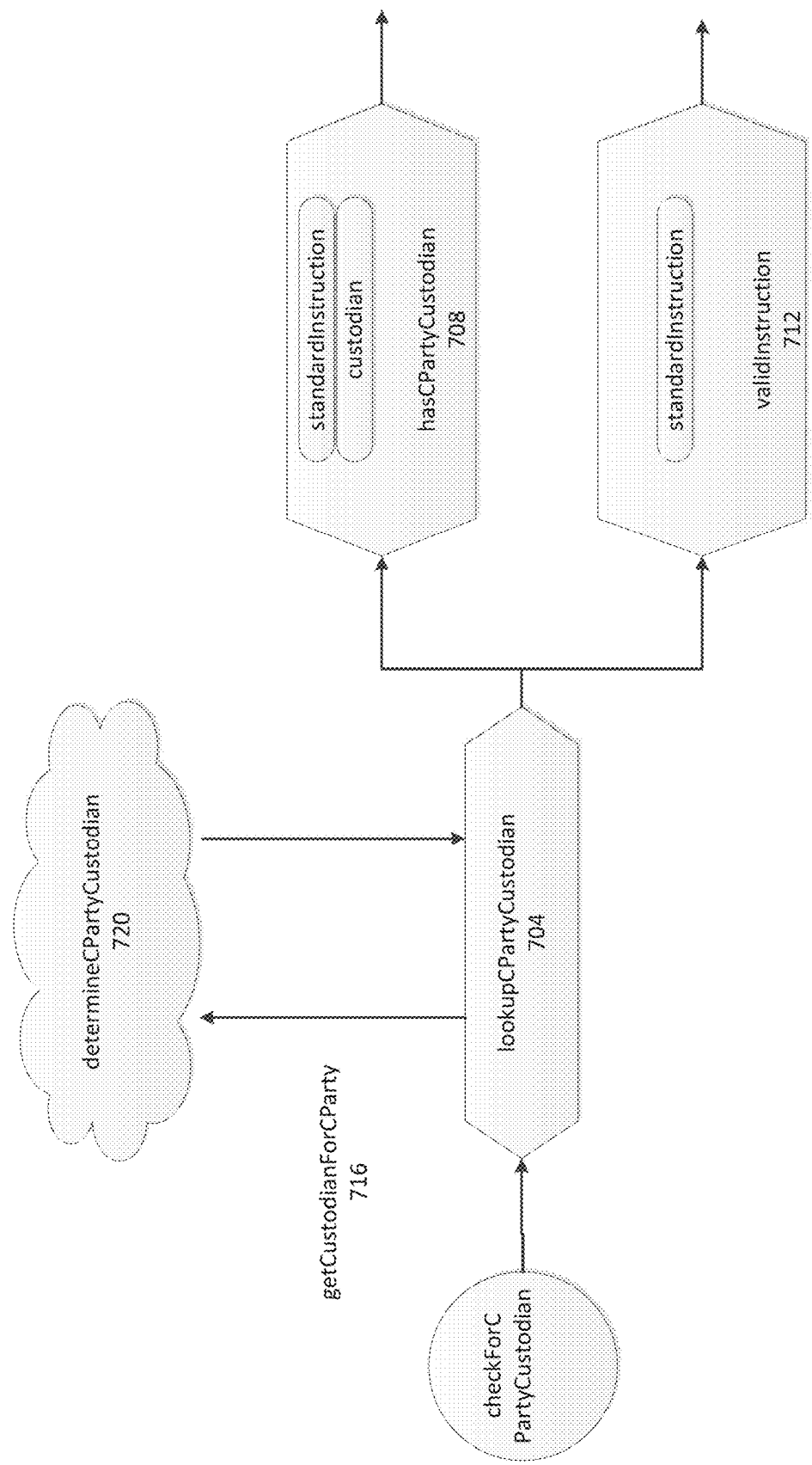
FIG. 7 illustrates a decomposed view of a checkforCPartyCustodian BAR in accordance with an embodiment of the present invention.

FIG. 7 illustrates a decomposed view of the checkforCPartyCustodian BAR 700 in accordance with an embodiment of the present invention, comprising of a getCustodianForCParty sequence event 716, lookupCPartyCustodian event 704, and two exit events, hasCPartyCustodian event 708 and validInstruction event 712. The checkforCPartyCustodian BAR 700 may be triggered by a triggering event, checkForCPartyCustodian. Upon initiation, the sequence event lookupCPartyCustodian sequence event 704 may be automatically triggered, causing a request for information from one or more data sources in order to obtain all of the data that is needed to process the activities at the checkforCPartyCustodian BAR 700. Examples of such sources include other BAR models, BAR packages. BARs, data services, databases and systems. In this case, the sequence event may cause the initiation of an event getCustodianForCParty event 716 that triggers the determineCPartyCustodian BAR model 720 to retrieve and provide the custodian BAR information in return. The retrieved custodian data may be in the form of a custodian business object containing information about the custodian.

While not shown in the figure, the lookupCPartyCustodian sequence event 704 may cause the processing of one or more business rules before and after the data is retrieved from the data source. For instance, the lookupCPartyCustodian sequence event 704 may cause the execution of an enrichment rule that examines the data available to the BAR and/or BAR package to determine whether additional information is necessary to complete the operations at the BAR or BAR package. In response, the lookupCPartyCustodian sequence event 704 may cause the triggering of the getCustodianForParty event 716, causing a determineCPartyCustodian BAR model 720 to retrieve and deliver the necessary data to the BAR package. Furthermore, after the data is received back from the external source, the lookupCPartyCustodian BAR 704 may cause the executing of mapping rule that maps the received data to a custodian business object. Corresponding data fields of the custodian data as retrieved from the determineCPartyCustodian BAR model 720 may be mapped to the fields of a custodian business object and stored accordingly. Therefore, BARs may also be configured to dynamically translate and normalize data received from any number of systems and channels.

On receipt of the additional counterparty data, each exit event of the BAR may be processed. As discussed in other portions of this disclosure, an exit event is an event which initiates as a result of an outcome of a business rule or due to all sequence events being satisfied. A BAR may have zero, one or more exit events. Further, business rules of each exit event may be executed independently and/or concurrently to cause any number of actions. Thus, rules associated with the hasCpartyCustodian event 708 may be executed to determine whether the retrieved business objects contain a counterparty, and to trigger an exit event that causes initiation of other BARs in the BAR package accordingly. In contrast, rules of the validInstruction exit event 712 may be executed to check that there are no counterpartys in the business objects and initiate yet other BARs in the BAR package where there is no such counterparty in the business object. In certain cases, exit events may cause the initiation of the same BAR, BAR package, BAR model or system. In this particular illustrated example, only one exit event will be initiated to cause additional BARs and/or actions in any one instance. However, it should be readily understand that BARs may cause the initialization of events that trigger more than just a single BAR and may in fact trigger events that causes the initialization of numerous BARs (or other systems, models, etc.). In doing so, efficiency may be further achieved.

In addition, exit events may further cause the passing of various business objects. For instance, the hasCPartyCustodian exit event 708 may pass the standardInstruction business object as well as the custodian business object retrieved to other BARs while the validInstruction exit event 712 may cause the passing of just the standardInstruction business object.

Figure 8:
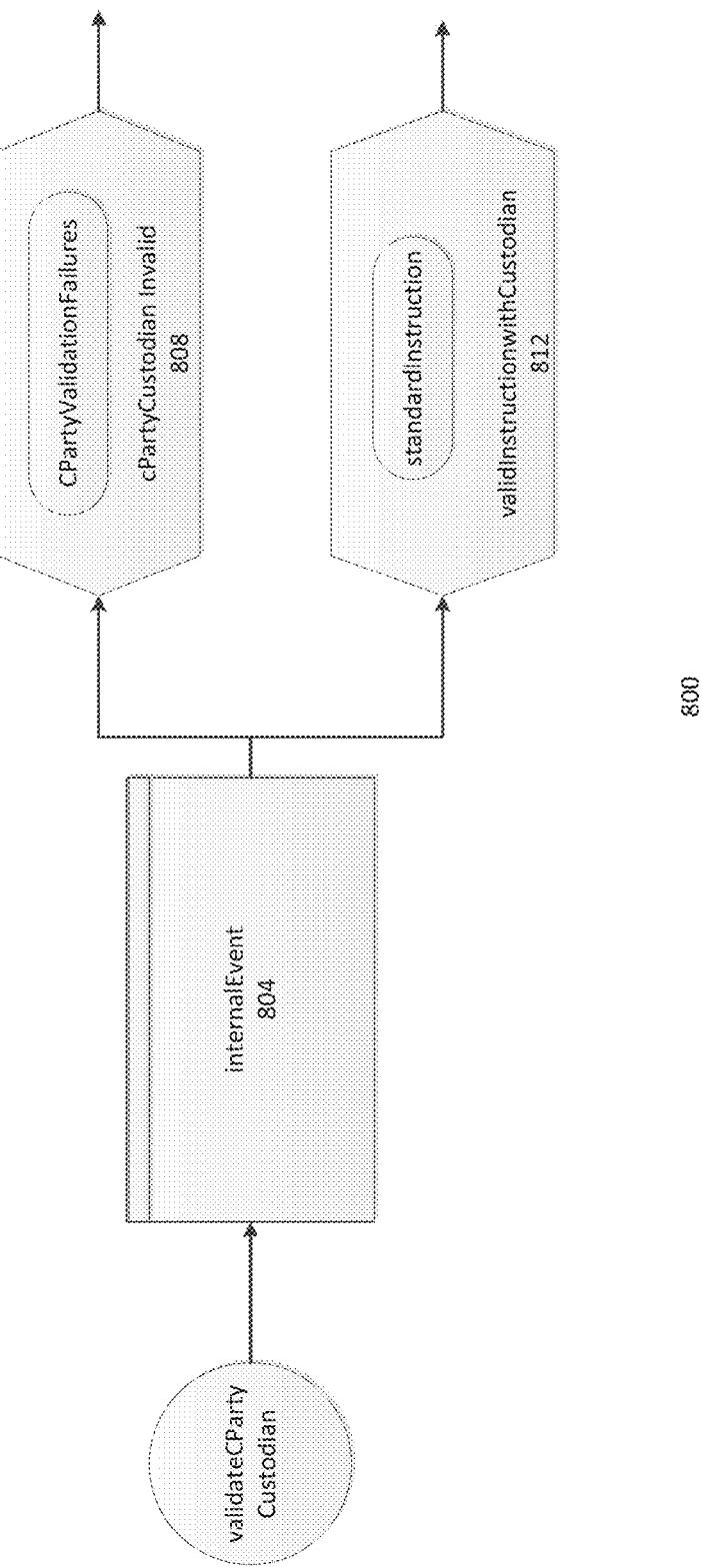
FIG. 8 depicts a decomposed view of a validateCParty-Custodian BAR in accordance with an embodiment of the present invention.

After checking the counterparty custodian and determining that a counterparty is present, the validateCPartyCustodian BAR 612 may be initiated by the triggering of its trigger event, validateCPartyCustodian 616, as shown in FIG. 6. FIG. 8 shows a decomposed view of the validateCPartyCustodian BAR 800 in accordance with an embodiment of the present invention containing a validation internal event 804 and two exit events, cPartyCustodianInvalid event 808 and validInstructionWithCustodian event 812. Upon initiation, the internal validation event 804 may execute a number of validation rules to check whether the standardInstruction business object meets a number of specific requirements. Any number or types of requirements may be utilized including requirements based on data structure as well as data content. For example, the standardInstruction business object may be processed to ensure that it is dated within a 24-hour period. Otherwise, an error business object may be generated consequently.

Once the internal event has been processed, the exit events of the BAR 800 may be processed accordingly. Both cPartyCustodianInvalid event 808 and validInstructionWithCustodian event 812 may cause the execution of a number of validation rules to check the business objects to determine if a counterparty custodian is valid (as in the case of the validInstructionWithCustodian event 812) or invalid (as in the case of the of the cPartyCustodianInvalid event 816).

If it is determined that the counterparty custodian is invalid, the BAR 800 may cause the execution of several mapping business rules associated with a cPartyCustodianInvalid exit event 808. In one embodiment, the exit event 812 may generate a cPartyValidationFailures business object containing data describing that the counterparty was found to be invalid and may detail reasons for the invalidation. Furthermore, the finding of an invalid counterparty custodian may cause the initiation of the cPartyCustodianInvalid event 808, triggering an external source such as another BAR model, BAR package, BAR, or system, to log the error.

If, instead, it is determined that the counterparty is valid, the BAR 800 may trigger the validInstructionwithCustodian event 808, which may trigger various external BAR models, packages, systems and other processes to react accordingly.

Figure 9:
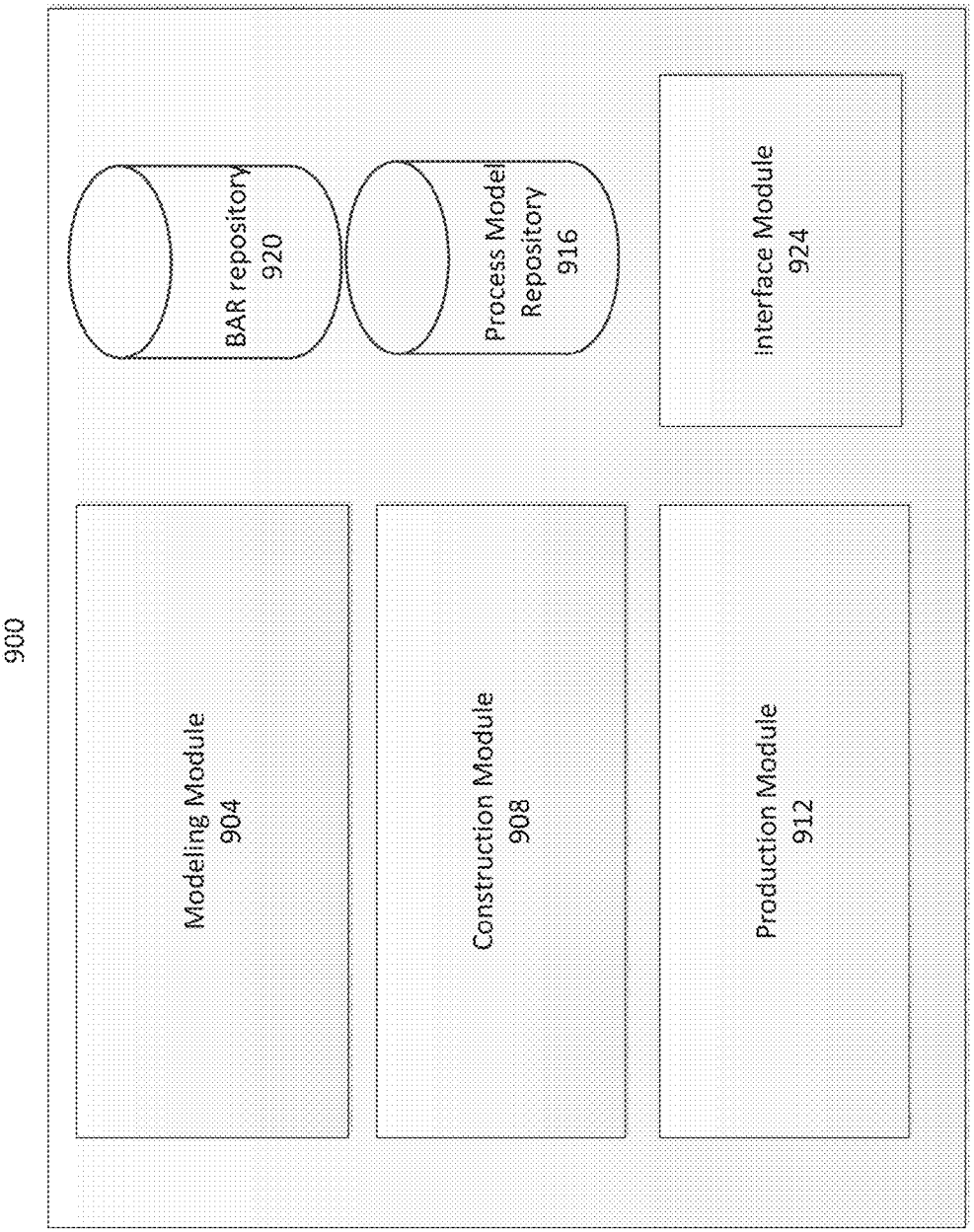
FIG. 9 depicts a BAR modeling system in accordance with an embodiment of the present invention.

FIG. 9 depicts a BAR modeling system 900 (hereinafter "BAR system") that implements the BAR model in accordance with an embodiment of the present invention. Containing a modeling module 904, a construction module 908, a production module 912, a process model repository 916, a BAR repository 920, and an interface module 924, the BAR system 900 may not only facilitate the creation and management of BAR models, but may further construct and produce code from the designed models that is executable across any number of platforms and operates with any number of channels. Although not shown, the BAR system 900 may also be connected with a number user terminal, financial institution, data services, and regulating agency, and other systems through a network to perform any number of actions. For example, the BAR system may interact with, retrieve data from, and create data at any such systems.

The modeling module 904 allows a BAR model to be defined, configured, and managed according to users, such as members of a software development team. A user, for example, may access the BAR system through a user terminal connected to the BAR system. The modeling module 904 may cause, via the interface module 924, the generation of a plurality of user interfaces through which a user may define a BAR model, including its components (i.e., the business terms, business objects, business rules, the business events, BARs and other elements). In defining a BAR, a user may also associate each BAR with any business term, object, rule, or event. The user may further select the sources of information, destination for business objects, and the relationships with various other internal and external computer systems and databases. In addition to the ability to define the BAR model and its elements, a user may also select qualified business terms, business objects, events, BARs, or other elements that have been previously used or defined in previous instances or in other BAR models.

In one embodiment, the interface module 924 generates a customizable interface that allows a user to define the BAR model using interactive objects. The user may be allowed to define the BAR model, BAR packages, BARs, events (e.g., triggering events) and other elements through interaction with one or more user interactive components, such as components of a logic-tree structure similar to those depicted in FIG. 2. A user may have the capability to define BARs by dragging configurable components into a BAR (e.g., rules and events) or by editing component attributes within each BAR. The user may also be able to drag pre-defined BARs onto the BAR model page. Furthermore, users may define triggering events and relationships between the BARs and BAR models by connecting one or more BARs or BAR models with one another, indicating that a first BAR may initiate an exit event that triggers a second BAR, for example. The user may customize the user interface depicted to the user and may zoom in or out, causing more or less information to be shown with respect to each BAR of a BAR model, for instance. In another instance, the user may view the BAR model at a model level, a package level, a BAR level, and even a component level. Further, in one embodiment, BARs may be constructed graphically within a number of user interfaces containing appropriate tools. Existing graphical interface tools may be incorporated into embodiments of the present invention to generate a user interface, such as M3 from OpenText.

A user of the system may further utilize the system to view and analyze the BAR models stored at the BAR system. The modeling module 908 and the interface module 928 may allow a user to view the BAR models at an abstract level. In one embodiment, a user may view the BAR model at a case overview level. The modules may further allow a user to view the BAR models at a detailed level by allowing the user to see each BAR and the flows of BARs making up a BAR model.

In a preferred embodiment, previously defined and utilized BAR elements may be managed by the modeling module 904 and stored at the BAR repository 920. The BAR repository 920 may further contain a data glossary in which qualified business terms are stored for reference. The data glossary of the BAR repository 920 may be configured to store a global collection of qualified business terms that may be utilized across all or some BAR models. The glossary may be stored at the BAR repository 920 as an XML or UML file and may be derived from a Common Information Model (CIM). In a preferred embodiment, the glossary may store numerous elements making up a qualified business term, including, but not limited to, its unique namespace, the term itself, its definition, and a version number.

After a BAR model is defined by a user of the system, the user may construct the model in preparation for production and implementation across platforms and channels. In a preferred embodiment, the construction module 908 constructs each model by preparing the model by means of flow actions, choreography and/or orchestration and may construct a BAR model by means of any of these methods based on the BAR model in question. Thus, a user may select the construction method desired. In at least one other method, the method of construction may be automatically determined by the construction module 908 according to any number of attributes of the BAR model to be constructed, including, but not limited to, the number of BARs, rules, events and internal and external services and systems involved. For example, choreography may be utilized as a construction method where there are complex processes with many interacting parts or many interacting systems, both internal and external. Construction may entail creation of a Business Logic Package, which includes one or more BARs, composed of definitions of all events, associated schemas and rule sets. The construction module 908 may utilize any number of available "wizards" or plugins to perform the construction in manners well known in the art.

Upon construction, embodiments of the present invention allow the production of the constructed BAR models across any number of platforms and channels. In particular, the production module 912 of the BAR system facilitates the production process by allowing users to test the BAR models in various runtime environments and to define the endpoint configurations of various events of the BAR model (e.g., triggering events at the end of BAR flow that is to be received by a system external to the BAR model). Furthermore, the production module 912 deploys the BAR model in various run-time environments. For example, the production module 912 may automatically and dynamically deploy a BAR model by compiling and linking the various components of the BAR model according to a specified platform or environment. Thus, in a preferred embodiment, the production module stores deployment instructions for various run-time environments. This schemas and code within a BAR may be combined into an executable (such as a POJO, or Plain Old Java Object, BPMN2 code PegaRules code, or whatever may be required by the executable environment). This object may also be associated with a configuration for the runtime environment intended (e.g. Spring Integration, Mule, JBPM).

In addition, the BAR system 900 may include a metadata model repository 916 that allows a user to select one or more model (process and shape) repositories well known in the art to operate in conjunction with a BAR model. Examples of Metadata repositories include Ab Initio EME, Infomatica MDR, and others. Process Model repositories may include ProVision, Aris, and others. Shape repositories may include ErWin, MagicDraw, and others. The process model repository may contain at a minimum the following models: Business Capability, Business Data, Process Hierarchy, Service Catalog, Business Workflow, Activity Flow and Business Rules. Shape Repositories contain schemas and UML models. Further, Metadata Repositories may contain all process and shape models, as well as developed, physical implementations (which include implemented rules), as well as the defined BAR packages (developed transactions). Interfaces between the Metadata Repository and other products in use are fully articulated through BAR packages (including testing requirements)

In one embodiment, the BAR modeling system 900 may further contain an administrator module (not shown) that allows one or more administrators to control the operations allowed for its users and may allow the administrator to define and edit the BAR elements that may be selected for use as part of a BAR model. Thus, a business analyst may utilize the BAR modeling system's administer module to define the universe of elements (e.g., qualified business terms, business objects, rules, and so on). This may, for example, prevent the creation of redundant artifacts and other user errors within a BAR model.

Figure 10:
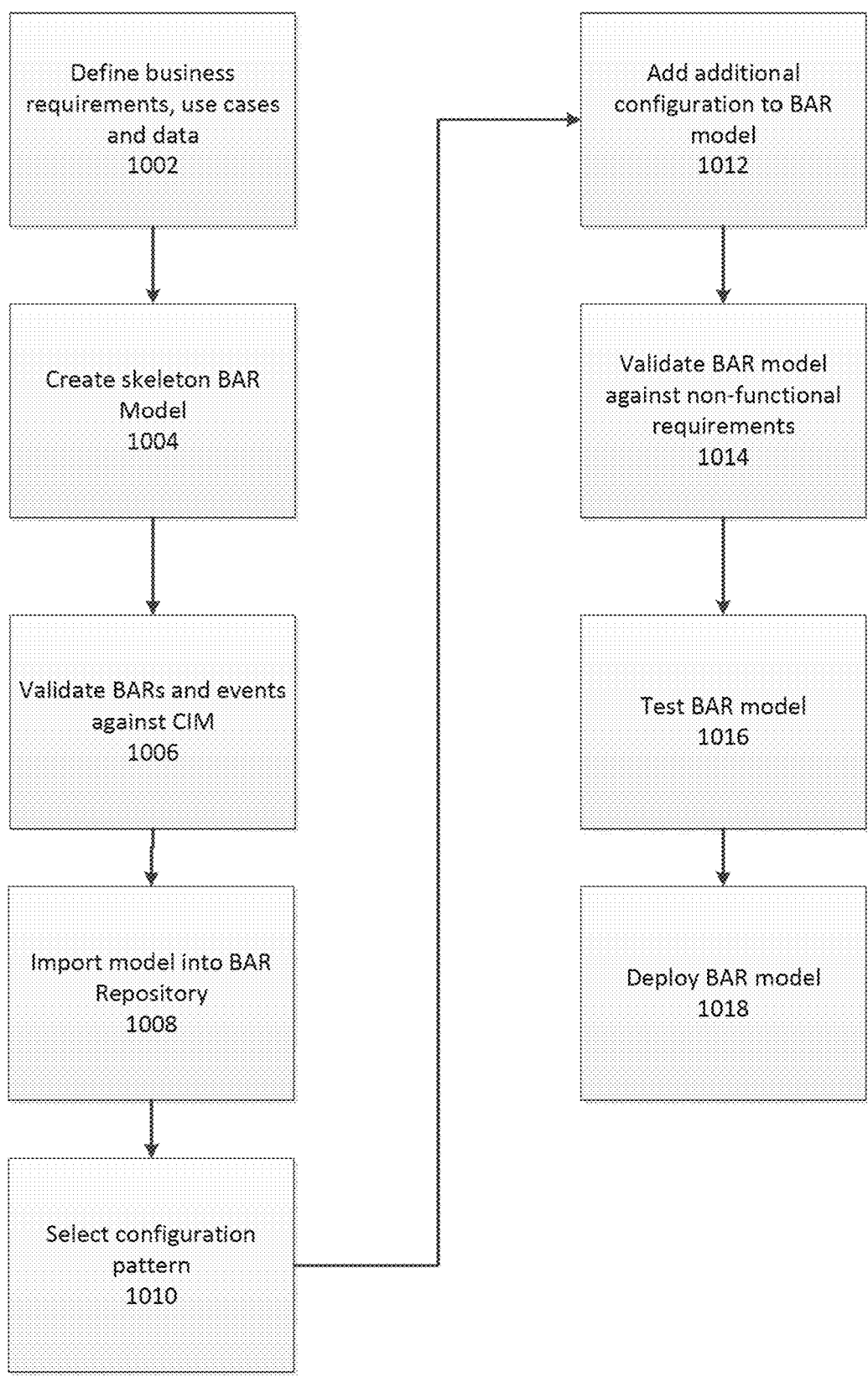
FIG. 10 depicts a method of constructing a BAR model in accordance with an embodiment of the present invention.

FIG. 10 depicts a method of constructing a BAR model in accordance with an embodiment of the present invention. At 1002, business requirements are defined and the appropriate use cases and data that would be capable of verifying the accuracy of a solution may be gathered. In one embodiment, an embodiment of the BAR system may allow the business analyst to define such requirements and test cases with one or more user-interfaces generated by the interface module of the BAR system. The qualified business terms for the project may also be defined and may be defined using a Common Information Model (CIM) framework.

At 1004, a skeleton BAR model is constructed using qualified business terms (e.g., derived from a Common Information Model) and/or the use cases. The model may be built by not only defining events and individual BARs, but also by selecting events and BARs stored at the BAR repository. In addition to creating and selecting BARs and events, a business analyst may further define associations between BARs and events, such as defining triggering events for a BAR. Furthermore, the BAR model created may include descriptions of the activities and events that may not be formal, but nonetheless enable a level of traceability between the final completed model and the business requirements.

BARs and events created may automatically be added to the BAR repository for re-use across models. However, events and BARs created may be subject to approval prior to being entered into the BAR repository and/or use within a BAR model. In one embodiment, the BAR system may be capable of automatically determining whether a BAR or event may be approved according to one or more predefined rules.

At 1006, the BARs and events created may be validated against the CIM created at 1002 to ensure that there is conformance between the CIM and the model that is created. The validation may include the validation of the model's use of qualified business terms. Where there are conflicts, such as if a qualified business term in a model is not within the CIM, then the BAR system may automatically detect and correct the model according to the CIM. In one embodiment, the BAR system may simply detect and identify the conflicts between the model and the CIM and may ask a user of the BAR system for resolution. In addition, rather than updating the model, the CIM may be updated instead. In one embodiment, any proposed changes to the CIM may automatically be submitted to an administrator of the BAR system for approval.

At 1008, the validated model may be imported into the BAR repository, such as by saving the defined model using a user interface feature generated by the interface engine.

At 1010, a configuration pattern may be selected that leverages the infrastructure and supports any non-functional requirements, including capacity and performance metrics, transactionality and recovery requirements. In one embodiment, the system is capable of supporting a file-based batch (Extract/Transform/Load ETL) and online transactional messaging over MQ out of the box. Other configurations may be made available as necessary.

At 1012, additional configurations of a BAR model may be added. In a preferred embodiment, rules are defined in NRL, thereby producing one direct implementation of the business requirements. A developer, for example, may take a BAR model and complete a BAR package by adding appropriate business objects and NRL rules to implement the business requirements within a user interface generated by the interface engine.

At 1014, the BAR model as completed may be validated by the BAR system for compliance with non-functional requirements, schemas, business objects and other elements stored at the BAR repository. Thus, embodiments of the present invention ensure that each non-functional business requirement is met before proceeding any further. Where there are any discrepancies or detected errors, the BAR system, in one embodiment, may automatically update the model to comply with requirements or may identify the issues to at least one administrator for resolution. In one embodiment, the BAR system analyzes the BAR model to ensure that the model complies with at least one structural requirement set by an administrator or another team member.

At 1016, the BAR model, as configured, may be tested across a number of run-time environments. The BAR system may input the test cases and associated variables into the model and compare the expected results with the actual results according to the model. A user of the BAR system may be provided with a list of identified errors and proposed solutions. If there are errors that are detected, the BAR system may reset the cycle and the user may be asked to reconfigure or redesign the BAR model from a previously completed step of the method (e.g., at any one of the steps 1002-1014). However, if the model passes the test cases, then the BAR system may automatically save the BAR model at a BAR repository. The BAR system may save all relevant information at the BAR repository including various information received, analyzed, and stored at each step, from initial development to completed testing (i.e., steps 1002-1016).

The BAR system may also identify the test cases in which the results were incorrect. In one embodiment, the BAR system may also identify the particular portions of a BAR model that is the cause for the error, such as by identifying the particular BAR, rule or event at fault. The BAR system may further generate for view by the user the proposed fix including how the BAR model may look with the proposed fix. For example, the BAR system may generate an alternate BAR with differing rules and events that resolve the error and may show the alternate BAR within the context of the BAR model or package.

At 1018, the model may be deployed into various environments by the production module of the BAR system. In doing so, the BAR system may identify the relevant inbound trigger events and output exit events of the BAR model and determine the systems that should operate in response to such events and linking these systems accordingly. Various other actions may be taken by the production module at this step in order to produce the model into selected environments and to ensure proper operations with various channels.

Figure 11:
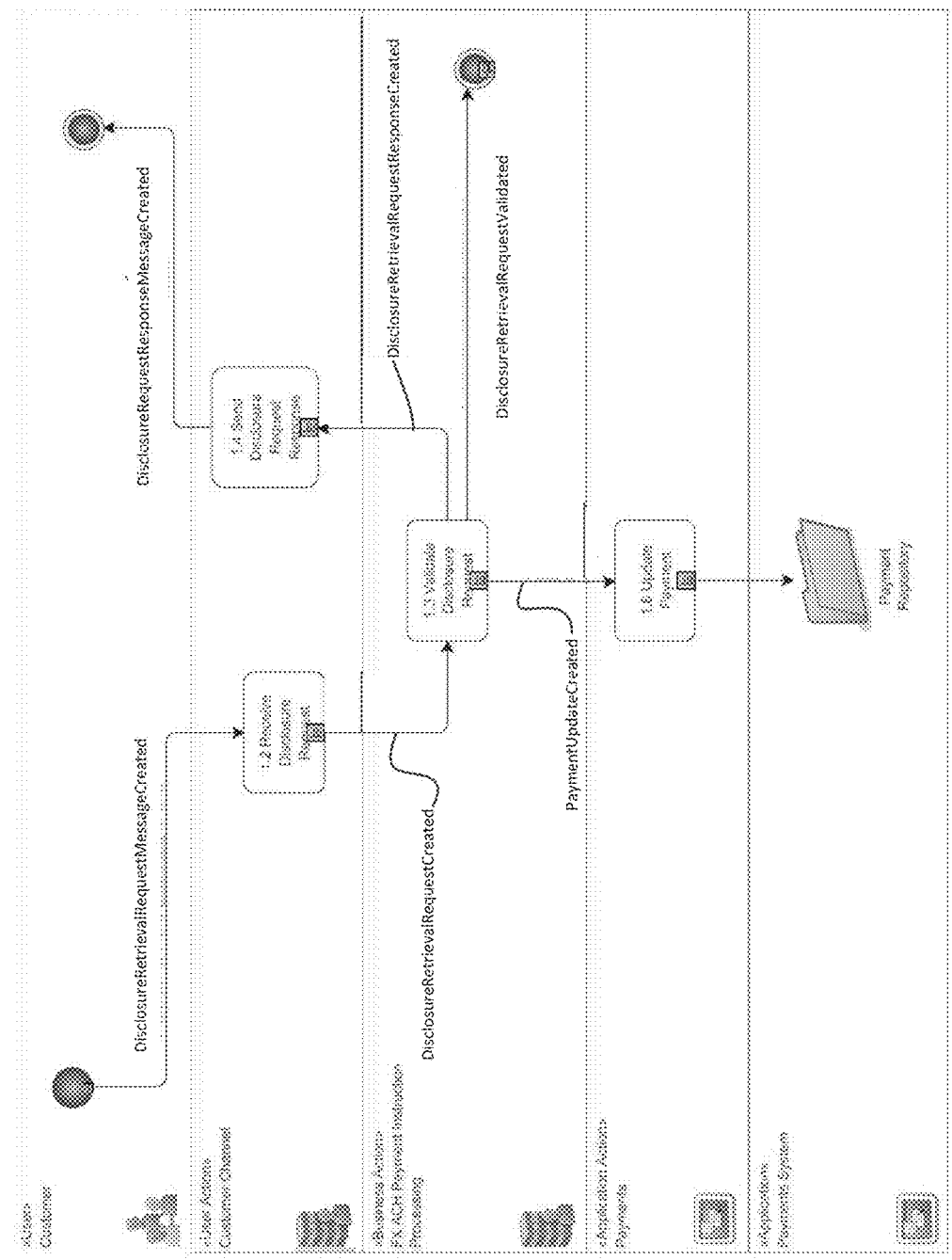
FIG. 11 depicts another exemplary BAR model in accordance with an embodiment of the present invention.

FIG. 11 depicts another exemplary BAR model in accordance with an embodiment of the present invention. The BAR model facilitates the retrieval of a retrieval request for a customer and operates across multiple levels and/or channels. A user may request the retrieval of a disclosure statement or information through the use of a computing device connected to a financial services system executing the BAR model. The user's request may cause the event DisclosureRetrievalRequestMessageCreated to be initialized, causing BAR 1.2 to execute, which may receive the disclosure request message. The BAR 1.2 may modify the disclosure request message received in accordance with predefined rules and may cause the event DisclosureRetrievalRequestCreated event to be generated, indicating that a system disclosure retrieval request has been created. In one embodiment, the request may be created based on the request message received. Furthermore, the DisclosureRetrievalRequestCreated event may cause the disclosure request to be validated by BAR 1.3. The BAR 1.3 may retrieve payment information from the payment repository and update payment information at the repository. In addition, two other events may be initiated: a DisclosureRetrievalRequestValidated which indicates to external BARs or systems that the retrieval request has been validated; and DisclosureRetrievalRequestResponseCreated, which indicates that a request response has been created. As seen from FIG. 11, the initialization of the DisclosureRetrievalRequestResponseCreated event may cause the disclosure request response to be sent via BAR 1.4. Accordingly, the user may receive the requested disclosure information.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or may include a variety of operating systems such as Microsoft Windows, operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The BAR system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit). ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee. IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Thus, embodiments of the present invention allow for the rapid development of business requirement models and the dynamic generation of code associated with any number of run-time environments according to the configured model definitions. In one embodiment of the present invention, developers may utilize the BAR model to develop and standardize presentations and user interfaces across any number of platforms or channels. Embodiments of the present invention further allow for integration with future standards, platforms and channels, such that code may be generated from existing BAR models for standards, platforms and/or channels that are yet to be developed or utilized.

The invention claimed is:

1. A business modeling system for modeling business processes with a business activity model for use in software development, the business modeling system comprising:
    a model data repository stored in memory, the model data repository including a library of business terms; and
    a modeling engine comprising at least one processor configured to model the business activity model, the modeling engine configured to perform at least the following:
        receiving, over a computer network, modeling input from a user, wherein, in response to receiving the modeling input from the user over the computer network, the at least one processor automatically executes stored instructions to perform at least the following:
            generating the business activity model based on the modeling input, the business activity model including at least one business activity unit that is associated with a business event and a business rule; and
            storing the business activity model in the model data repository; and
        receiving, over the computer network, a selection of a plurality of runtime environments or platforms, wherein in response to receiving the selection over the computer network, the at least one processor automatically executes stored instructions to perform at least the following:
            retrieving configurations of the selection of the plurality of runtime environments or platforms;
            filtering the business activity model to select endpoint events in said business activity model;
            configuring, based on the configurations of the selection of the plurality of runtime environment or platforms, said selected endpoint events, and said business activity model, at least one endpoint channel configuration for each of the selected runtime environments or platforms, wherein the at least one endpoint channel configuration, when executed, allows the plurality of external systems to communicate with a plurality of external endpoint systems over a plurality of communication channels upon the detection of at least one endpoint event;
            generating executable code modules for the plurality of runtime environments or platforms corresponding to the business activity model, wherein the generated executable code modules are automatically and dynamically linked to components required by the selection of a plurality of runtime environments or platforms;

transmitting the executable code modules to the plurality of external systems for execution, which, when executed, causes the plurality of external systems to perform at least one business process of the business processes.

2. The business modeling system of claim 1, wherein the modeling engine is configured to model a second business activity model, the second business activity model including the at least one business activity unit or a second at least one business activity unit associated with the business event, and wherein the modeling input includes a selection of the at least one business activity unit or the business event.

3. The business modeling system of claim 1, wherein the business activity and the business event are independently configurable from the business activity model.

4. The business modeling system of claim 1, wherein the business activity model includes a business package configured to perform a business process, the business package includes a plurality of business activity units.

5. The business modeling system of claim 1, wherein the business activity unit is further associated with a business object, the business object including a plurality of business terms.

6. The business modeling system of claim 1, wherein detection of the business event causes a computer system to execute at least a portion of the executable code corresponding to an associated business rule.

7. The business modeling system of claim 1, wherein the business rule controlling how a business activity is processed by a computer system executing at least a portion of the executable code corresponding to the business activity.

8. The business modeling system of claim 1, wherein the business rule is one of a validation rule, a mapping rule or an enrichment rule.

9. The business modeling system of claim 1, wherein the business activity model is associated with a plurality of business rules and the business rules are grouped by the modeling engine into sets of rule types.

10. The business modeling system of claim 1, wherein the business event is a trigger event, wherein detection of the trigger event causing a computer system to execute at least a portion of the executable code corresponding to the business activity unit.

11. The business modeling system of claim 10, wherein business activity unit is associated with only one trigger event.

12. The business modeling system of claim 1, wherein the business event is an exit event, wherein detection of the exit event causing a computer system to execute at least a portion of the executable code corresponding to a second business activity unit associated with the exit event.

13. The business modeling system of claim 12, wherein the exit event corresponds to a trigger event associated with the second business activity unit.

14. The business modeling system of claim 1, wherein the business event is a sequence event, wherein detection of the sequence event causing a computer system to execute at least a portion of the executable code corresponding to the business activity unit to communicate with at least one external service or system.

15. A business modeling system for modeling business processes with a business activity model for use in software development, the business modeling system comprising:
a model data repository stored in memory, the model data repository including a library of business terms; and
a modeling engine comprising at least one processor configured to model the business activity model, the modeling engine configured to perform at least the following:
receiving, over a computer network, modeling input from a user;
generating the business activity model based on the modeling input, the business activity model including at least one business activity unit that is associated with a business event and a business rule;
storing the business activity model in the model data repository; and
receiving, over the computer network, a selection of one of a plurality of runtime environments or platforms, wherein in response to receiving the selection over the computer network, the at least one processor automatically executing stored instructions to perform at least the following:
retrieving configurations of the selected one of the plurality of runtime environments or platforms;
filtering the business activity model to select endpoint events in said business activity model;
configuring, based on the configurations of the selected one of the plurality of runtime environments or platforms, said selected endpoint events, and said business activity model, at least one endpoint channel configuration for each of the runtime environments or platforms, wherein the at least one endpoint channel configuration, when executed, allows the plurality of external systems to communicate with a plurality of external endpoint systems over a plurality of communication channels upon the detection of at least one endpoint event;
generating executable code modules for the selected one of a plurality of runtime environments or platforms corresponding to the business activity model, wherein the generated executable code modules are automatically and dynamically linked to components required by the selected one of a plurality of runtime environments or platforms;
validating the generated executable code based on at least one business requirement;
automatically modifying the business activity model based on the validating step; and
storing the business activity model in the model data repository.

16. A method for modeling business processes with a business activity model for use in software development, the method comprising:
receiving, over a computer network, modeling input from a user, wherein, in response to receiving the modeling input from the user over the computer network, at least one processor is configured to automatically execute stored instructions to perform at least the following:
generating the business activity model based on the modeling input, the business activity model including at least one business activity unit that is associated with a business event and a business rule;
storing the business activity model in the model data repository, the model data repository including a library of business terms; and
receiving, over the computer network, a selection of one of a plurality of runtime environments or platforms, wherein in response to receiving selection over the computer network, the at least one processor automatically executing stored instructions to perform at least the following:

retrieving configurations of the selection of one of the plurality of runtime environments or platforms;

filtering the business activity model to select endpoint events in said business activity model;

configuring, based on the configurations of the selection of one of the plurality of runtime environment or platforms, said selected endpoint events, and said business activity model, at least one endpoint channel configuration for each of the runtime environment or platforms, wherein the at least one endpoint channel configuration, when executed, allows the plurality of external systems to communicate with a plurality of external endpoint systems over a plurality of communication channels upon the detection of at least one endpoint event;

generating executable code modules for the plurality of runtime environments or platforms corresponding to the business activity model, wherein the generated executable code modules are automatically and dynamically linked to components required by the selection of a plurality of runtime environments or platforms;

transmitting the executable code modules to a plurality of external systems for execution, which, when executed, causes the plurality of external systems to perform at least one business process of the business processes.

17. The business modeling method of claim 16, wherein the modeling input includes a selection of the at least one business activity unit or the business event, the method further comprising the step of modeling a second business activity model, the second business activity model including the at least one business activity unit or a second at least one business activity unit associated with the business event.

18. The business modeling method of claim 16, wherein the business activity and the business event are independently configured from the business activity model.

19. The business modeling method of claim 16, wherein the business activity model includes a business package configured to perform a business process, the business package includes a plurality of business activity units.

20. The business modeling method of claim 16, wherein the business activity unit is further associated with a business object, the business object including a plurality of business terms.

21. The business modeling method of claim 16, wherein detection of the business event causes a computer system to execute at least a portion of the executable code corresponding to business rule.

22. The business modeling method of claim 16, wherein the business rule controlling how a business activity is processed by a computer system executing at least a portion of the executable code corresponding to the business activity.

23. The business modeling method of claim 16, wherein the business rule is one of a validation rule, a mapping rule or an enrichment rule.

24. The business modeling method of claim 16, wherein the business activity model is associated with a plurality of business rules and the business rules are grouped by the modeling engine into sets of rule types.

25. The business modeling method of claim 16, wherein the business event is a trigger event, wherein detection of the trigger event causing a computer system to execute at least a portion of the executable code corresponding to the business activity unit.

26. The business modeling method of claim 25, wherein the business activity unit is associated with only one trigger event.

27. The business modeling method of claim 16, wherein the business event is an exit event, wherein detection of the exit event causing a computer system to execute at least a portion of the executable code corresponding to a second business activity unit associated with the exit event.

28. The business modeling method of claim 27, wherein the exit event corresponds to a trigger event associated with the second business activity unit.

29. The business modeling method of claim 16, wherein the business event is a sequence event, wherein detection of the sequence event causing a computer system to execute at least a portion of the executable code corresponding to the business activity unit to communicate with at least one external service or system.

30. The business modeling method of claim 16, further comprising the step of generating a plurality of executable code for execution at a plurality of computer systems.

* * * * *